Dec. 8, 1959
R. L. BURCH ET AL
2,915,834
MANUALLY OPERABLE INSTRUCTIONAL DEVICE
FOR TEACHING ARITHMETIC
Filed June 16, 1958
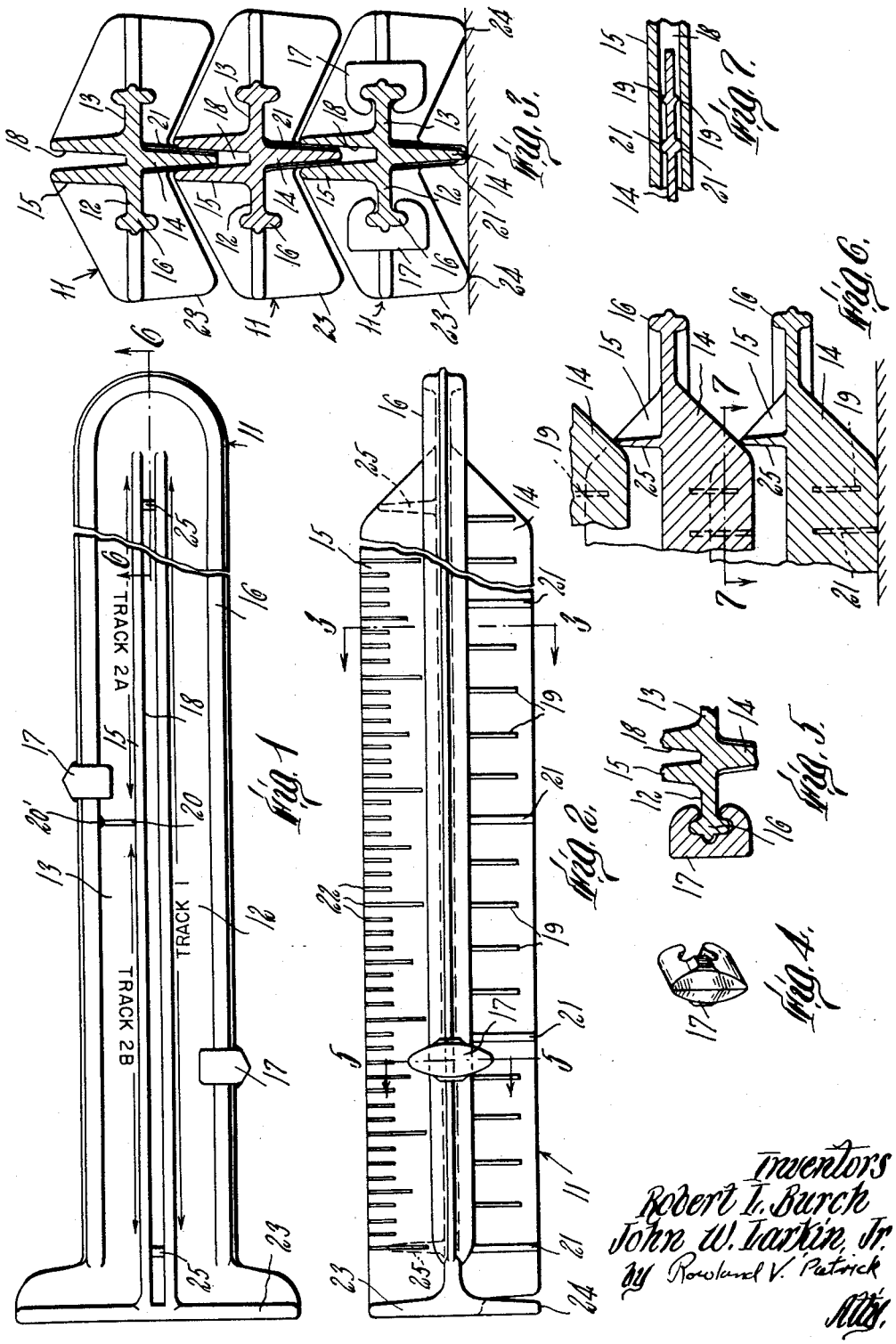
Inventors
Robert L. Burch
John W. Larkin, Jr.
by Rowland V. Patrick
Atty.

United States Patent Office 2,915,834
Patented Dec. 8, 1959

2,915,834

MANUALLY OPERABLE INSTRUCTIONAL DEVICE FOR TEACHING ARITHMETIC

Robert L. Burch, Sharon, and John W. Larkin, Jr., Natick, Mass.

Application June 16, 1958, Serial No. 742,365

5 Claims. (Cl. 35—33)

This invention relates generally to instructional aids for children, and in particular it is concerned with a manipulative device in the nature of a toy for the teaching and study of arithmetic.

It is an object of the invention to provide an instructional arithmetic device that is especially well suited to the objective demonstration or experimental discovery of fundamental mathematical principles.

It is another object of the invention to provide an instructional arithmetic device which lends itself equally well to a variety of teaching methods such as teacher demonstrations, individual and small group experimentation, and parallel teacher-pupil manipulation.

It is still another object of the invention to provide an instructional arithmetic device that is easy for both pupils and teachers to use, that is easy to handle and store, that is rugged, that is relatively simple and inexpensive to manufacture, and that is readily adjustable to a variety of classroom procedures.

It is a still further object of the invention to provide an instructional arithmetic device that children will be attracted to much as a toy, thereby to stimulate their interest in numbers.

It is a further object of the invention to provide an instructional arithmetic device in the nature of an abacus but which also is adapted to be used in games, scorekeeping, and for constructive play.

The novel features of the invention together with further objects and advantages thereof will become apparent from the following detailed description of a preferred embodiment illustrated in the accompanying drawing.

In the drawing:

Fig. 1 is a plan view of the device according to the invention;

Fig. 2 is a side view in elevation of the device according to the invention;

Fig. 3 is a sectional view taken on line 3—3 of Fig. 2;

Fig. 4 is a perspective view of one of the beads used in the device according to the invention;

Fig. 5 is a sectional view taken on line 5—5 of Fig. 2;

Fig. 6 is a sectional view taken on line 6—6 of Fig. 1; and

Fig. 7 is a sectional view taken on line 7—7 of Fig. 6.

With reference first to Fig. 3, it will be observed that the device according to the invention includes an element 11 adapting it to be nested in interfitting relation with so many other devices of like character as desired. A vertical array of three such interfitted devices has been shown by way of example although it will be appreciated that many more elements can be combined in either a horizontal or vertical array. Preferably, each element 11 is formed of plastic, and has a sectional outline of generally cruciform shape. Thus, it may be regarded as having two sets of mutually orthogonal ribs, the ribs extending in the horizontal direction being designated at 12 and 13 and the ribs extending in the vertical direction being designated 14 and 15. Ribs 12 and 13 project beyond ribs 14 and 15 at one end of the element or member as shown in Figs. 1 and 2, and in this region toward the right of the figures the ribs 12 and 13 are merged and their corners are rounded to provide a continuous arcuate contour of their meeting edges. Along the edges there is a flange 16 which defines a hairpin-shaped track beginning at the left of element 11, passing from one side of the ribs 14 and 15 to the other, and terminating at the left of the member. Flange 16 is adapted to receive a plurality of beads 17 such as the one shown in detail in Figs. 4 and 5. From Figs. 4 and 5 it will be observed that each bead 17 has a groove that mates with the flange in a sliding fit. By virtue of their construction, the beads are sufficiently flexible so that they may be snapped onto the track at any desired point.

Ribs 14 and 15 are also shaped in a complementary manner such that a plurality of elements 11 can be interfitted to form an integral array either horizontally or vertically. Thus, the rib 15 is provided with a longitudinal groove 18 to receive as a tongue the rib 14. The position of a rib 14 in a groove 18 lengthwise of the elements is fixed by webs 25 at either end of the groove 18. Spaced ridges 21 are formed on the rib 14 to stiffen it and to provide bearing surfaces therefor when it is placed in a groove 18. Rib 14 also carries shorter ridges 19 whose spacing corresponds to the width of the beads. As shown in Fig. 7, ridges 19 are less pronounced as are ridgelike graduations 22 on the rib 15 defining a scale. Also there is a rib 20 to mark the position of a nub 20' on the track which stops the beads at this point, but which is not so large as to prevent the beads from passing if a little extra force is applied to them.

Toward the left of the element 11 and preferably integral therewith is an inverted V-shaped wing 23 extending generally in a plane at right angles to the longitudinal axis of the member. Wing 23 is adapted to maintain the device with the ribs 12 and 13 horizontal, and the ribs 14 and 15 vertical. Thus, its feet portions 24 are disposed on either side of the ribs 14 and are adapted to register in a plane common to the longitudinal edge of the rib 14. The inclination of the upper edges of the wing is preferably slightly greater than that of the lower edges so that the wings or devices in a vertical stack will nest properly and thereby lend lateral stability to the entire assembly. This is clearly shown in Fig. 3. In a horizontal array of the devices, wings 23 serve as bases to support the devices on end.

Because the number of devices used, their orientation, and the number of beads on them are variable at will, a large variety of mathematical and quantitative processes and principles can be demonstrated. For example, with one device:

(1) By displaying seven beads side by side along the track and then sliding five more beads along to join the seven beads, the number fact 7+5=12 may be shown.

(2) One way of showing 12—5 would be to remove from the track five of twelve displayed beads, leaving the remainder seven.

(3) Beads may be arrayed in groups of equal size to demonstrate multiplication facts, as in showing four groups of three beads for 4×3=12.

(4) Division may be shown by sliding groups of beads away from a larger group of beads as in repeatedly sliding three beads away from a group of seventeen beads until there are five groups of three beads each, with two beads remaining, demonstrating that 17÷3=5, r. 2.

When two or more devices are joined as indicated in Fig. 3 and Fig. 6, the following are additional examples of what may be done:

(1) Seven elements stacked one above the other, with ten beads each, together with a single element displaying four beads could be used to represent the number 7 tens and 4 ones, or 74. By removing one bead from the single element and three of the elements displaying ten beads, the subtraction of 74—31 could be represented.

(2) An abacus may be made by joining several elements and placing them so that the tracks are oriented vertically. Beads placed above the slight impediment on the track of each element will stay there until pushed over the impediment one at a time or in groups. From one to ten beads may be pushed on to the lower part of each track to represent numbers in place-value columns and all the manipulations usually associated with an abacus may be performed.

Although the invention has been described in connection with a single preferred embodiment, it will be appreciated that this embodiment is susceptible of various modifications that are within the spirit and scope of the invention. Therefore, the invention should not be deemed to be limited to the details of what has been described and illustrated herein by way of example but should be deemed to be limited only by the scope of the appended claims.

What is claimed is:

1. An instructional arithmetic device comprising an elongated member of generally cruciform section presenting two sets of mutually orthogonal ribs, a first of said sets of ribs being rounded at one end of said member and having flanges along their edges to define a hairpin-shaped track passing from one side of the second set of ribs to the other, and the second set of ribs being contoured in complementary fashion to permit members of like character to be arrayed in interfitting relation, and a plurality of beads slidably mounted on the track and being movable to selected positions lengthwise thereof.

2. An instructional arithmetic device comprising an elongated member of generally cruciform section presenting two sets of mutually orthogonal ribs, a first of said sets of ribs being rounded at one end of said member and having flanges along their edges to define a hairpin-shaped track passing from one side of the second set of ribs to the other, and the second set of ribs being contoured in complementary fashion to permit members of like character to be arrayed in interfitting relation, a stabilizing wing at the opposite end of said member adapted to maintain the member oriented with the first set of ribs horizontal and the second set of ribs vertical, and a plurality of beads slidably mounted on the track and being movable to selected positions lengthwise thereof.

3. An instructional arithmetic device comprising an elongated member of generally cruciform section presenting two sets of mutually orthogonal ribs, a first of said sets or ribs being rounded at one end of said member and having flanges along their edges to define a hairpin-shaped track passing from one side of the second set of ribs to the other, and one of the ribs of the second set being provided with a longitudinal groove adapted to receive as a tongue the rib opposite thereto associated with a member of like character, a stabilizing wing at the opposite end of said member defining a pair of feet astride the second set of ribs, said feet being adapted to register in a plane parallel to the first set of ribs and common to the longitudinal edge of the rib acting as a tongue, thereby to maintain the member oriented with the first set of ribs horizontal and the second set of ribs vertical, and a plurality of beads slidably mounted on the track and being movable to selected positions lengthwise thereof.

4. An instructional arithmetic device comprising an elongated member of generally cruciform section presenting two sets of mutually orthogonal ribs, a first of said sets of ribs being rounded at one end of said member and having flanges along their edges to define a hairpin-shaped track passing from one side of the second set of ribs to the other, and one of the ribs of the second set being provided with a longitudinal groove adapted to receive as a tongue the rib opposite thereto associated with a member of like character, an inverted V-shaped wing extending generally in a plane perpendicular to the longitudinal axis of said member at the opposite end thereof, said wing defining feet to maintain the member oriented with the first set of ribs horizontal and the second set of ribs vertical, and being adapted to mate with wings of like character in an interfitting array of the members, and a plurality of beads slidably mounted on the track and being movable to selected positions lengthwise thereof.

5. An instructional arithmetic device comprising an elongated member of generally cruciform section presenting two sets of mutually orthogonal ribs, a first of said sets of ribs being rounded at one end of said member and having flanges along their edges to define a hairpin-shaped track passing from one side of the second set of ribs to the other, and the second set of ribs being contoured in complementary fashion to permit members of like character to be arrayed in interfitting relation, a plurality of beads slidably mounted on the track and being movable to selected positions lengthwise thereof, and at least one stop in the form of a surface irregularity on the track at a selected point lengthwise thereof to impede the travel of the beads past said point.

References Cited in the file of this patent

UNITED STATES PATENTS

| | | |
|---|---|---|
| 1,327,775 | Platt | Jan. 13, 1920 |
| 1,467,550 | Lord | Sept. 11, 1923 |
| 2,800,728 | Bergman | July 30, 1957 |

FOREIGN PATENTS

| | | |
|---|---|---|
| 844,511 | Germany | July 21, 1952 |